US010387153B2

(12) United States Patent
Cimadamore et al.

(10) Patent No.: US 10,387,153 B2
(45) Date of Patent: Aug. 20, 2019

(54) SYNCHRONIZING A SET OF CODE BRANCHES

(71) Applicant: Oracle International Corporation, Redwood Shores, CA (US)

(72) Inventors: Maurizio Cimadamore, Donabate (IE); Brian Goetz, Williston, VT (US)

(73) Assignee: Oracle International Corporation, Redwood Shores, CA (US)

(*) Notice: Subject to any disclaimer, the term of this patent is extended or adjusted under 35 U.S.C. 154(b) by 3 days.

(21) Appl. No.: 15/822,481

(22) Filed: Nov. 27, 2017

(65) Prior Publication Data

US 2019/0163478 A1 May 30, 2019

(51) Int. Cl.
*G06F 9/44* (2018.01)
*G06F 17/00* (2019.01)
(Continued)

(52) U.S. Cl.
CPC ........ *G06F 9/30058* (2013.01); *G06F 9/3861* (2013.01); *G06F 8/65* (2013.01);
(Continued)

(58) Field of Classification Search
CPC ............... G06F 9/30058; G06F 9/3861; G06F 9/44516; G06F 9/44589; G06F 9/3017; G06F 11/3624; G06F 11/3632; G06F 11/3688; G06F 11/368; G06F 11/3628; G06F 11/3636; G06F 11/3612; G06F 8/36; G06F 8/40; G06F 8/41; G06F 8/447; G06F 8/48; G06F 8/65; G06F 8/74; G06F 17/2288; G06Q 10/06; G06Q 10/101; G06Q 10/103
(Continued)

(56) References Cited

U.S. PATENT DOCUMENTS 8,037,452 B2    10/2011   Minium et al.
8,464,228 B2 *   6/2013   Campbell ................. G06F 8/36
                                                               717/140
(Continued)

OTHER PUBLICATIONS

Using plan branches, Atlassian Documentation, pp. 1-12, Jul. 5, 2017.
(Continued)

*Primary Examiner* — Daniel H Pan
(74) *Attorney, Agent, or Firm* — Invoke

(57) ABSTRACT

Techniques for synchronizing a set of code branches are disclosed. A synchronization process is triggered by an event and/or a schedule. The synchronization process includes traversing each code branch, such that parent branches of a particular branch are "in sync" prior to being merged into the particular branch. In an embodiment, a hierarchical order for a set of branches is determined. The branch represented by the top node of the hierarchical order does not have any parents. A branch that is a child of the branch represented by the top node is in the second level of the hierarchical order. The branch in the second level is updated by incorporating the current state of the branch represented by the top node. Thereafter, each branch is iteratively updated by incorporating the current state of the branch's parent branch. Hence, changes to any parent branch are propagated through all its descendant branches.

21 Claims, 8 Drawing Sheets

(51) Int. Cl.
*G06Q 10/06* (2012.01)
*G06F 11/36* (2006.01)
*G06F 9/30* (2018.01)
*G06F 9/38* (2018.01)
*G06F 9/445* (2018.01)
*G06F 8/71* (2018.01)
*G06F 8/65* (2018.01)

(52) U.S. Cl.
CPC ............ *G06F 8/71* (2013.01); *G06F 9/44536* (2013.01); *G06F 9/44589* (2013.01); *G06F 11/368* (2013.01); *G06F 11/3624* (2013.01); *G06Q 10/06* (2013.01)

(58) Field of Classification Search
USPC ........ 712/234, 227, 248; 717/121, 122, 124, 717/127, 140, 145, 170, 101, 103; 707/608, 610, 638
See application file for complete search history.

(56) References Cited

U.S. PATENT DOCUMENTS

| | | | |
|---|---|---|---|
| 8,495,100 B2 | 7/2013 | Cheung | |
| 8,495,564 B2 | 7/2013 | Martineau | |
| 9,311,064 B1 | 4/2016 | Whittington et al. | |
| 9,430,229 B1 | 8/2016 | Van et al. | |
| 2006/0225040 A1* | 10/2006 | Waddington | G06F 8/71 717/122 |
| 2010/0083230 A1* | 4/2010 | Ramakrishnan | G06F 8/71 717/121 |
| 2013/0014083 A1* | 1/2013 | Martineau | G06F 8/71 717/122 |
| 2013/0151940 A1* | 6/2013 | Bailor | G06F 17/24 715/229 |
| 2013/0185252 A1* | 7/2013 | Palmucci | G06F 17/2288 707/608 |
| 2015/0106790 A1* | 4/2015 | Bigwood | G06F 11/3624 717/127 |
| 2016/0239295 A1 | 8/2016 | Kolesnik et al. | |

OTHER PUBLICATIONS

Smart branching with SourceTree and Git-flow, SourceTree blog.
Keeping your forked repo synced with the upstream source, 2buntu.
JDK Sandbox Development Repository, http://cr.openjdk.java.net/~chegar/docs/sandbox.html.
About pull requests—User documentation, https://help.github.com/articles/about-pull-requests/.

\* cited by examiner

SYNCHRONIZING A SET OF CODE BRANCHES

TECHNICAL FIELD

The present disclosure relates to version control and branching. In particular, the present disclosure relates to synchronizing a set of code branches.

BACKGROUND

Version control includes managing changes to software, documents, and/or other collections of information. In software development, for example, multiple teams may work on a particular software application. Each team may develop different features, handle different bugs, and/or work on different aspects of the software application. Each team may also desire to develop code for the software application concurrently.

Branching allows for the concurrent development of multiple versions of a set of code. Each code branch (also referred to herein as a "branch") is associated with the development of a different feature, bug fix, and/or aspect of a software application. A particular branch is associated with sequential versions of a set of code for developing a particular feature of the software application. When concurrent development of another feature of the software application is desired, a new branch is created from the particular branch. The particular branch may be referred to as the "parent branch," while the new branch may be referred to as a "child branch." The child branch incorporates the version of the set of code that exists on the parent branch at the branching point. Thereafter, each branch is developed independently from each other. Each branch develops a different version of the set of code from the version of the set of code that exists at the branching point. A version of the set of code on one branch may be merged with a version of the set of code on another branch. The merged result may include the changes to the set of code branch from both branches.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
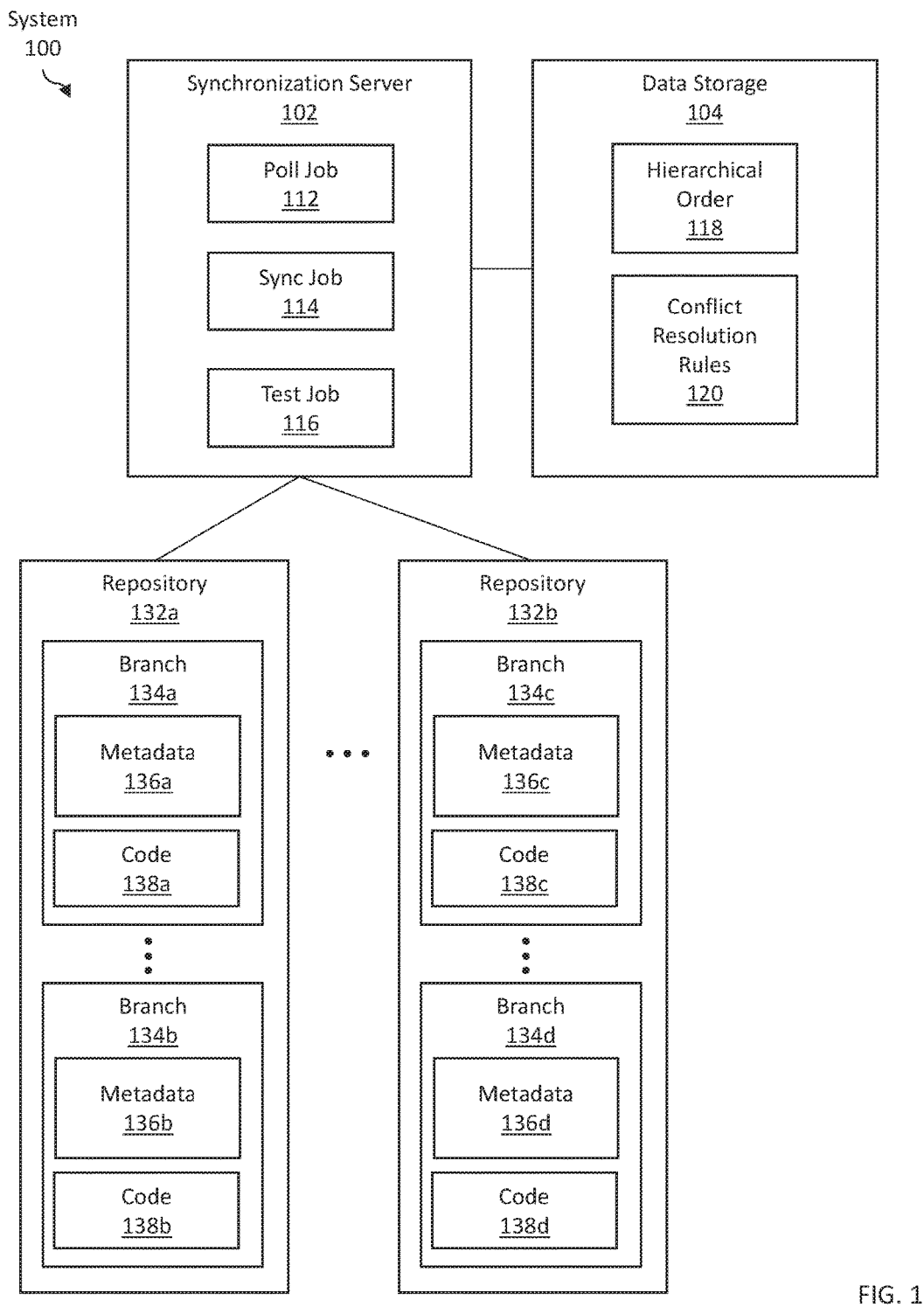
FIG. 1 illustrates a system for synchronizing a set of code branches, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. BRANCH MANAGEMENT SYSTEM ARCHITECTURE
3. SYNCHRONIZING A SET OF CODE BRANCHES
4. EXAMPLE EMBODIMENT
5. HARDWARE OVERVIEW
6. MISCELLANEOUS; EXTENSIONS

1. General Overview

Embodiments relate to synchronizing a set of code branches. The set of code branches is associated with a set of code. Each code branch is associated with sequential versions of a set of code along a particular line of development. A particular version of the set of code on a code branch may also be referred to herein as a "state" of the code branch. A new branch (also referred to as a "child branch") may be generated from an existing branch (also referred to as a "parent branch"). The child branch incorporates the version of the set of code that exists on the parent branch at the branching point. Thereafter, development of the set of code occurs independently on each of the parent branch and the child branch. Since new changes on the parent branch (subsequent to the branching point) are not yet incorporated into the child branch, the child branch may be referred to herein as being "out of sync" with the parent branch. Synchronizing the set of code branches includes updating the child branch, by incorporating the current state of the parent branch, to generate an updated state of the child branch. Updating the child branch by incorporating the current state of the parent branch may also be referred to herein as "merging the parent branch into the child branch."

One or more embodiments include serially synchronizing a set of code branches on a periodic basis, or in response to a triggering event. The periodic or event-based synchronizing operations may be executed, without manual user intervention, using metadata that defines relationships between different code branches.

As an example, a set of code branches includes at least three code branches: a first branch, a second branch, and a third branch. The first branch is a parent of the second branch; the second branch is a parent of the third branch. The first branch may also be referred to herein as a "grandparent branch" of the third branch. Each code branch may be developed independently. A branch that has not yet incorporated all changes on all of its ancestor branches may be referred to as being "out of sync." Synchronizing the set of code branches includes traversing each of the code branches, such that parent branches of a particular branch are "in sync" prior to being merged into the particular branch. As an example, after a change has occurred on the first branch, both the second branch and the third branch are out of sync. Synchronizing the set of code branches includes updating the second branch by incorporating the updated state of the first branch to generate an updated state of the second branch. Synchronizing the set of code branches further includes, subsequent to updating the second branch, updating the third branch by incorporating the updated state of the second branch.

As an example, a set of code branches includes at least three code branches: a first branch, a second branch, and a third branch. Each of the first branch and the second branch is a parent of the third branch. A change occurs on the first branch, and another change occurs on the second branch. The set of code branches needs to be synchronized. The third code branch is updated by incorporating an updated state of the first branch. Then, the third code branch is updated again by incorporating an updated state of the second branch. Hence, the third code branch incorporates the updated state of each of the parents of the third code branch.

As an example, a set of code branches includes at least three code branches: a first branch, a second branch, and a third branch. The first branch is a parent of each of the second branch and the third branch. A change occurs on the first branch. The set of code branches needs to be synchronized. The second branch is updated by incorporating an updated state of the first branch. The third branch is updated by incorporating the updated state of the first branch. Hence, all children of the first branch are updated based on the updated state of the first branch.

As an example, a set of code branches includes at least five code branches: a first branch, a second branch, a third branch, a fourth branch, and a fifth code branch. The first branch is parent of the second branch; the second branch is a parent of each of the third branch and the fourth branch; each of the third branch and the fourth branch is a parent of the fifth branch. After a change occurs on the first branch, the set of code branches needs to be synchronized.

The second branch is updated by incorporating the updated state of the first branch. Subsequent to updating the second branch, the third branch is updated by incorporating the updated state of the second branch, and the fourth branch is updated by incorporating the updated state of the second branch. Hence, after reaching a synchronized state, a parent branch (e.g., the second branch) is merged into each of its child branches (e.g., the third branch and the fourth branch).

Subsequent to updating the third branch and the fourth branch, the fifth branch is updated by incorporating the updated state of the third branch and by incorporating the updated state of the fourth branch. Hence, a child branch (e.g., the fifth branch) is updated based on the updated state of each of its parent branches (e.g., the third branch and the fourth branch), after each respective parent branch reaches a synchronized state.

In the process of attempting to merge a parent branch into a child branch, a conflict may be detected. The conflict may be resolved based on conflict-resolution rules and/or user input. Alternatively, rather than attempting to resolve the conflict, it is first determined whether the child branch has other parent branches. If the child branch has other parent branches, then a merge between another parent branch and the child branch is attempted. After attempting to merge each of the parent branches of the child parent without success, then there is an attempt to resolve a conflict between at least one of the parent branches and the child branch.

One or more embodiments include performing an automatic synchronization process, without any user manually requesting the synchronization process. As an example, an automatic synchronization process may be performed periodically, such as, once per hour, or once per day. As another example, an automatic synchronization process may be performed in response to a triggering event. A triggering event may be a change to a set of code associated with a trunk branch (which is, a branch without any parent branches). Alternatively, a triggering event may be a change on any of a set of designated branches.

When branches are developed independently and not regularly merged, a large number of conflicts between the branches may accumulate. When the branches are finally merged, intensive conflict resolution of complex conflicts may be required. Manual merging between branches relies on a developer to merge on a regular basis and to select the appropriate branches for merging. In contrast, a system-triggered synchronization process helps to ensure that merges are performed regularly, so that the number and/or complexity of conflicts would be reduced. Rather than relying on a developer to select branches for merging, a system-triggered synchronization process traverses all branches associated with a set of code and/or within one or more particular repositories. Further, a system-triggered synchronization process traverses parent branches prior to child branches to ensure that changes are propagated through all branches.

One or more embodiments described in this Specification and/or recited in the claims may not be included in this General Overview section.

2. Branch Management System Architecture

FIG. 1 illustrates a system for synchronizing a set of code branches, in accordance with one or more embodiments. As illustrated in FIG. 1, a branch management system 100 includes a synchronization server 102, a data storage 104, and one or more code repositories 132a-b. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, a code repository (such as, repository 132a-b) is a system for managing version control for a set of code, documents, and/or files. Each code repository maintains a set of codes. Each code repository may store multiple versions of the set of code. As illustrated, for example, repository 132a maintains branches 134a-b, and repository 132b maintains branches 134c-d. Additional repositories may be used.

As described above, a code branch (such as, code branch 134a-d) is associated with sequential versions of a set of code along a particular line of development. A child branch incorporates a version of the set of code that exists at the branching point. Each branch is associated with metadata (such as, metadata 134a-d) and code (such as, code 138a-d).

Metadata of a branch indicates characteristics of the branch. As an example, metadata of a particular branch may indicate the parent branches of the particular branch. The metadata may include a name of the parent branches and/or a pointer to the parent branches. As another example, metadata may include a date and time at which a branch was created, a user who created the branch, and/or other information.

Branches of the same repository may be associated with different versions of the same set of code. As an example, branch 134*a* may be associated with developing an inbox feature for a software application, and branch 134*b* may be associated with developing a photo feature for the software application. Code 138*a* may be a version of a set of code that includes the inbox feature. Code 138*b* may be a version of the set of code that includes the photo feature.

In an example, a master repository 132*a* is configured to provide a set of open-source code, such as OpenJDK (Open Java Development Kit). Members of the public are free to contribute to the set of open-source code. Each developer (such as, an individual, a team, and/or an organization) creates his own working repository (such as, repository 132*b*) for development. A developer first clones the set of open-source code from repository 132*a* to create repository 132*b*. After development within repository 132*b*, a developer may push his version of code from repository 132*b* to repository 132*a*.

In this example, repository 132*a* maintains a master branch. Members of the public develop code based on the current version of the set of code on the master branch. Repository 132*b* maintains a default branch (also referred to as a "main branch") and one or more experimental branches. The default branch begins with a copy of a current version of the set of code on the master branch at the time repository 132*b* is created. Thereafter, each change to the code on the master branch is pushed to the default branch. Each experimental branch may be associated with the development of a particular feature and/or aspect of the set of code. An experimental branch begins with a copy of a current version of the set of code on the default branch at the time of branching from the default branch. Changes are made on each branch independent of other branches. When changes are made to a parent branches of a particular experimental branch (the parent branch may be the default branch or another experimental branch), the parent branch may be merged into the particular experimental branch In an example, changes on an experimental branch may be pushed onto its parent branch and/or other ancestor branches. Changes from a downstream branch may be pushed on its upstream branch when, for example, development on the downstream branch is complete, or development on the downstream branch reaches a particular milestone. In some embodiments, changes on an experimental branch are pushed onto the main branch in repository 132*b*. Changes on the main branch in repository 132*b* may then be pushed to the master branch in repository 132*a*. In some embodiments, changes on an experimental branch are pushed directly to the master branch in repository 132*a*, without first going through the main branch in repository 132*b*. Thereafter, the changes on the master branch in repository 132*a* are merged into the main branch in repository 132*b*.

In one or more embodiments, a data storage 104 is any type of storage unit and/or device (e.g., a file system, database, collection of tables, or any other storage mechanism) for storing data. Further, a data storage 104 may include multiple different storage units and/or devices. The multiple different storage units and/or devices may or may not be of the same type or located at the same physical site. Further, a data storage 104 may be implemented or may execute on the same computing system as a synchronization server 102. Alternatively or additionally, a data storage 104 may be implemented or executed on a computing system separate from a synchronization server 102. A data storage 104 may be communicatively coupled to a synchronization server 102 via a direct connection or via a network.

Information describing a hierarchical order 118 for a set of branches and conflict resolution rules 120 may be implemented across any of components within the system 100. However, this information is illustrated within the data repository 104 for purposes of clarity and explanation.

In one or more embodiments, a hierarchical order 118 of a set of branches indicates which the relationships between the set of branches 134*a-d*. The hierarchical order 118 indicates which branches are the parents of a particular branch, and/or which branches are the children of a particular branch. The hierarchical order 118 may be determined based on the metadata 136*a-b* associated with the set of branches 134*a-d*.

Figure 2:
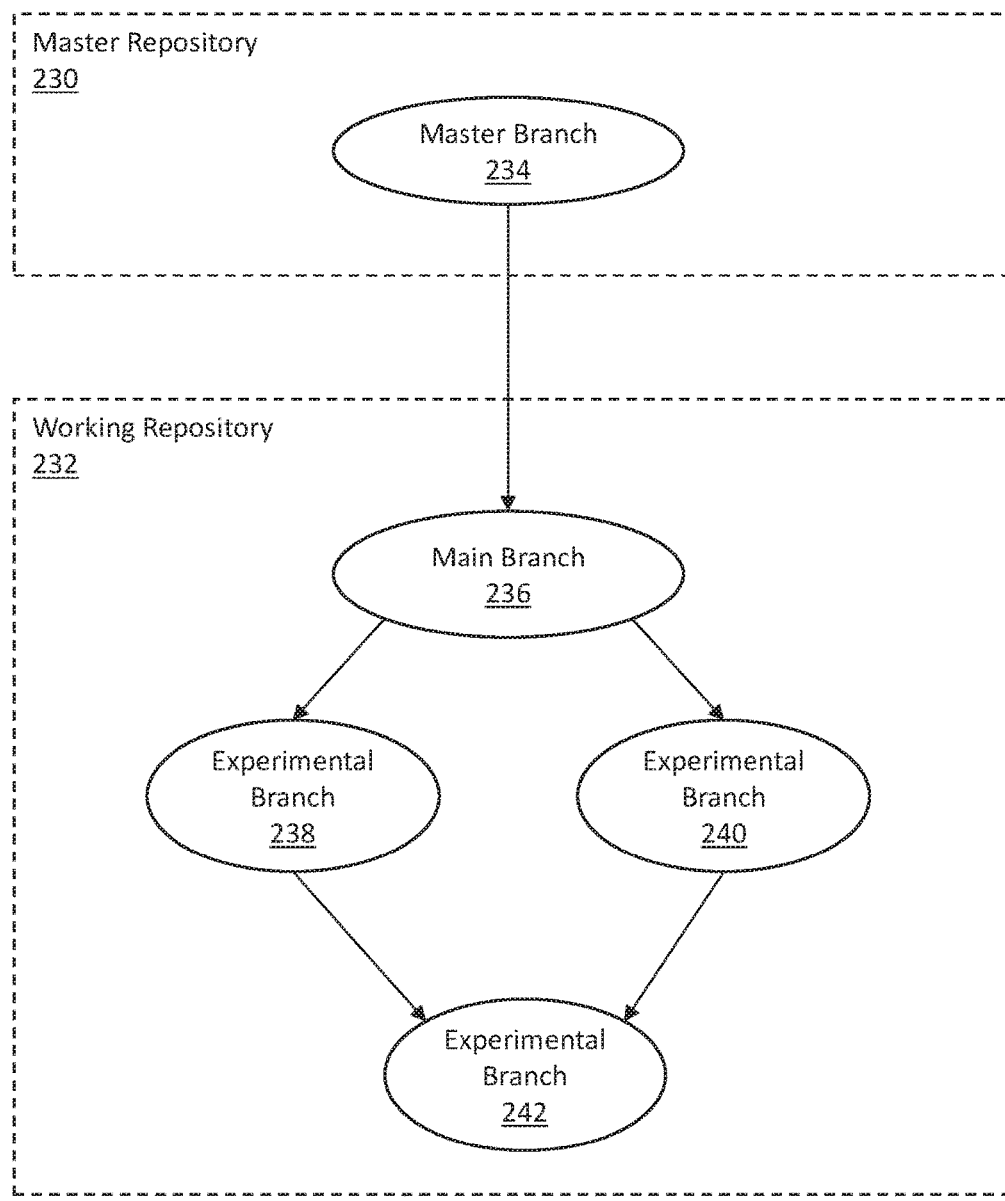
FIG. 2 illustrates an example hierarchical order of a set of code branches, in accordance with one or more embodiments.

FIG. 2 illustrates an example hierarchical order for a set of branches. A master repository 230 maintains a master branch 234. A working repository 232 maintains a main branch 236, and experimental branches 238-242. The main branch 236 is a child of the master branch 234. Each of the experimental branches 238-240 is a child of the main branch 236. The experimental branch 242 is a child of each of the experimental branches 238-240. As illustrated, the hierarchical order 200 is presented as a tree graph. A node at the top of the tree graph represents the master branch 234. One level down, there is a node representing the main branch 236. Another level down, there are nodes representing experimental branches 238-240. Another level down, there is a node representing experimental branches 242. The tree graph indicates the relationships between the master branch 234, the main branch 236, and the experimental branches 238-242.

As illustrated in FIG. 2, there may be intra-repository dependencies between branches, and/or inter-repository dependencies between branches. Examples of intra-repository dependencies include the relationship between the main branch 236 and the experimental branch 238, and the relationship between the experimental branch 238 and the experimental branch 242. An example of an inter-repository dependency includes the relationship between the master branch 234 of the master repository 230 and the main branch 236 of working repository 232.

In one or more embodiments, conflict resolution rules 120 are rules for resolving conflicts detected during an attempt to merge two branches. Different conflict resolution rules 120 may apply to different types of conflicts. As an example, one type of conflict is a difference in the comments, in the code files, that indicate information related to the code files, such as, the last modified date and the authors. A conflict resolution rule may determine to resolve a conflict in last modified date by using the most recent date. Additionally or alternatively, a conflict resolution rule may determine to resolve a conflict in the listing of authors by appending all authors are named in any list into one list. As another example, one type of conflict is a difference in the ordering in which packages are included in code files. A conflict resolution rule may resolve the conflict by adopting the ordering used in one of the code files.

In one or more embodiments, a synchronization server 102 refers to hardware and/or software configured to perform operations described herein for synchronizing a set of code branches. Examples of operations for synchronizing a set of code branches are described below with reference to FIGS. 3A-C and FIG. 4.

In an embodiment, a synchronization server 102 includes a poll job 112, a sync job 114, and/or a test job 116. The poll job is configured to detect changes in any repository 132*a-b* associated with a set of code. If a change is detected, then the sync job 114 is executed.

The sync job 114 is configured to propagate changes through the set of branches 134*a-d*. The sync job 114 first determines a hierarchical order 118 for the set of branches 134*a-d*. The sync job 114 traverses each of the branches 134*a-d* beginning with the branch represented by the top node of the hierarchical order 118. The sync job 114 synchronizes a particular branch prior to merging the particular branch into a child branch. As an example, referring to the hierarchical order of FIG. 2, changes may be independently made on each of the master branch 234, the main branch 236, and the experimental branches 238-242. The sync job 114 first incorporates a current state of the master branch 234 into the main branch 236. The main branch 236 now includes the changes that were made on the main branch 236 itself as well as the changes that were incorporated from the master branch 234. The sync job 114 then incorporates a current state of the main branch 236 into the experimental branch 238. The experimental branch 238 now includes the changes that were made on the experimental branch 238 itself as well as the changes that were incorporated from the main branch 236, which in turn includes the changes that were made on the main branch 236 itself and the changes that were incorporated from the master branch 234. The sync job 114 iteratively propagates the changes onto each of experimental branches 240-242 in a similar manner.

The test job 116 is configured to test each of the set of branches. Whenever a new branch is created in a repository, a test job is created and executed. Subsequently, the test job may be executed again on a periodic basis (e.g., once per week) and/or in response to a particular trigger (e.g., a change occurs on the branch). The test job 116 helps ensure that all branches in a repository are adequately built and tested on a regular basis.

In an embodiment, a synchronization server 102 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a mainframe, a television, a content receiver, a set-top box, a printer, a mobile handset, a smartphone, a personal digital assistant (PDA).

3. Synchronizing a Set of Code Branches

Figure 3A:
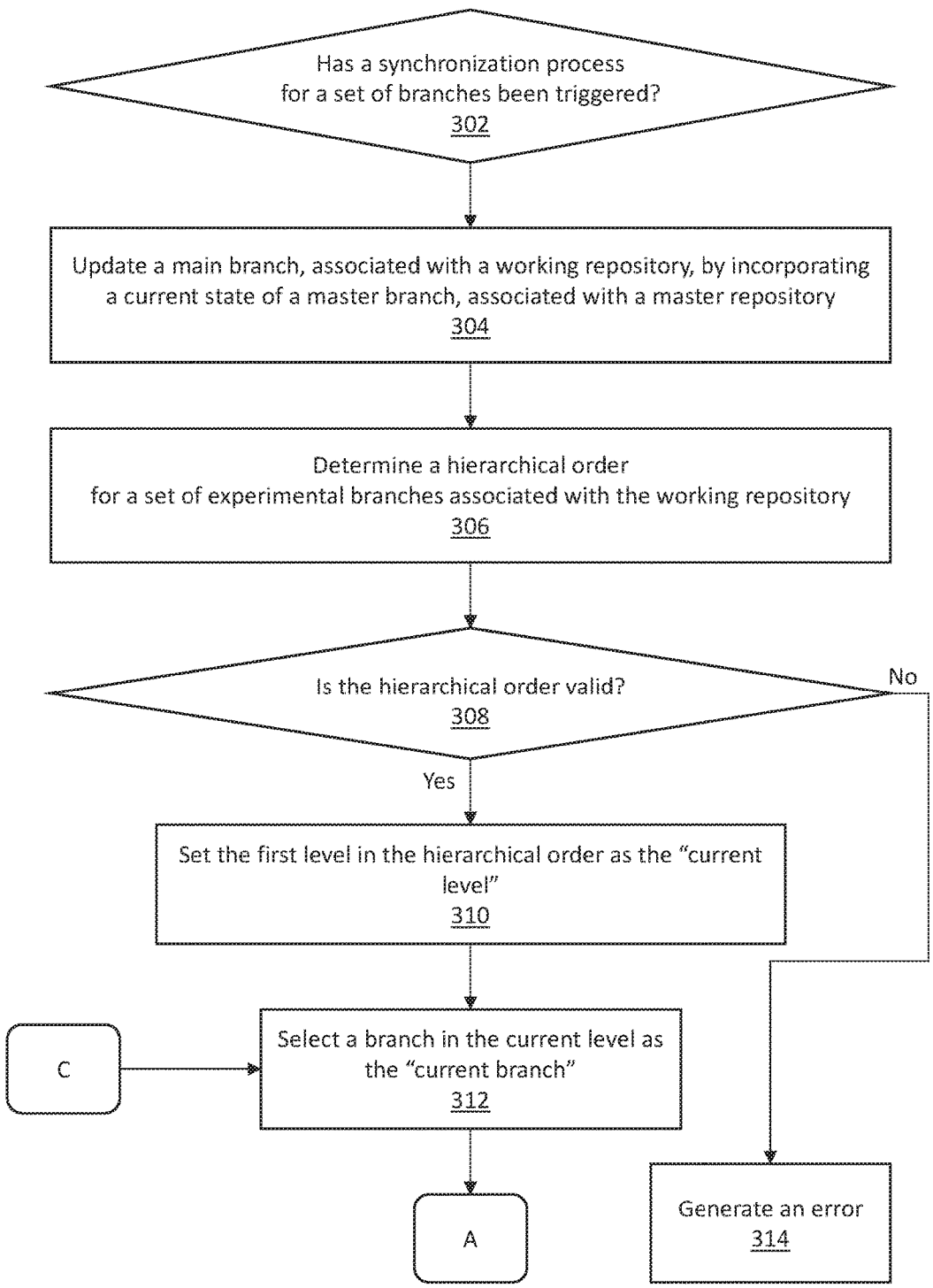
FIGS. 3A-C illustrates an example set of operations for synchronizing a set of code branches, in accordance with one or more embodiments.
Figure 3B:
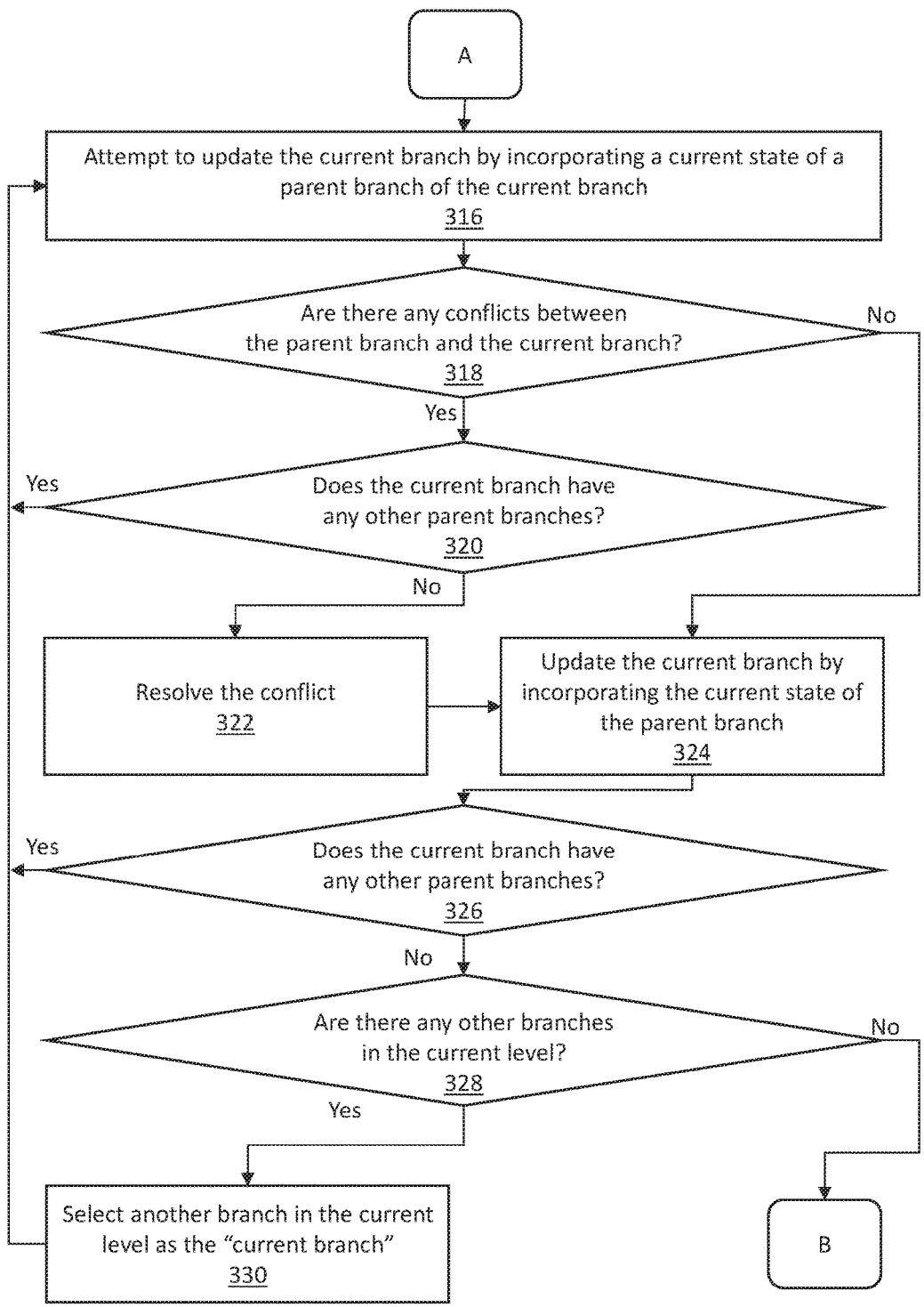
Figure 3C:
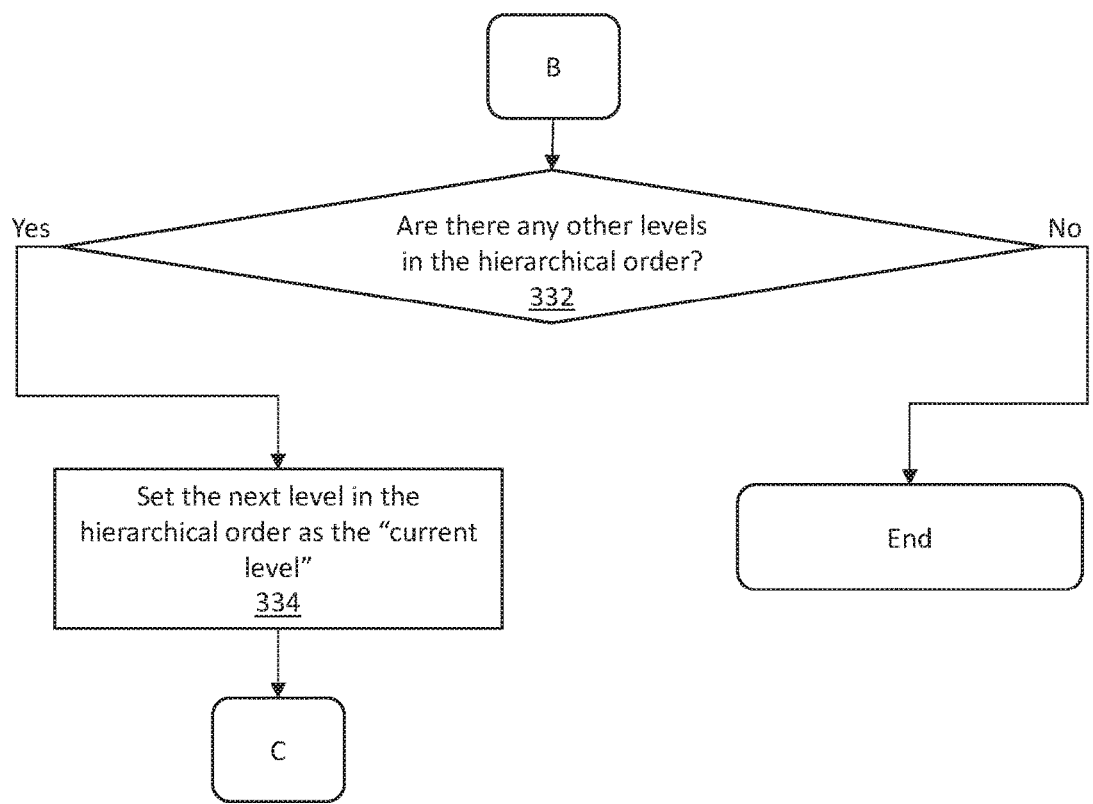

FIGS. 3A-C illustrates an example set of operations for synchronizing a set of branches, in accordance with one or more embodiments. One or more operations illustrated in FIGS. 3A-C may be modified, rearranged, or omitted all together. Accordingly, the particular sequence of operations illustrated in FIGS. 3A-C should not be construed as limiting the scope of one or more embodiments.

In an embodiment, the synchronization process as illustrated in FIGS. 3A-C is performed for a set of code maintained by a master repository and one or more working repositories. The master repository maintains a master branch. A working repository maintains a main branch and one or more experimental branches. The main branch is created by incorporating a particular state of the master branch. An experimental branch is created by incorporating a particular state of the main branch. The synchronization process may be performed for the set of branches being maintained across the master repository and the working repositories. In other embodiments, the synchronization process as illustrated in FIGS. 3A-C is performed for a set of code that is maintained by a different arrangement of repositories. For example, all branches may be maintained in a single repository. Alternatively, multiple branches may be maintained in each repository.

One or more embodiments include determining whether a synchronization process for a set of branches has been triggered (Operation 302). A branch management system 100 determines whether a synchronization process has been triggered based on various criteria. Each synchronization process that is triggered and/or performed may also be referred to herein as a "synchronization cycle."

An example of a triggering criteria may be a change detected in any repository associated with a set of code. Another example of a triggering criteria may be a change detected in an upstream repository. Referring to FIG. 2, for example, the master repository 230 serves as an upstream repository to the working repository 232, because changes to the master branch 234 in the master repository 230 are pushed down to the main branch 236 in the working repository 232. Another example of a triggering criteria may be a scheduled time of day and/or day of week. The schedule may indicate that the synchronization process should occur, for example, once per hour. Different schedules may apply in different circumstances or on different days of the week.

The synchronization process may be triggered without any manual user intervention. A user does not enter any command that requests initiation of a particular synchronization cycle.

One or more embodiments include updating a main branch, associated with a working repository, by incorporating a current state of a master branch, associated with a master repository (Operation 304). When a synchronization process is triggered, the master branch is merged into the main branch. The changes on the master branch, since the last merger, are incorporated into the main branch.

As an example, a set of code may include 100 code files. A particular state of the parent branch corresponds to a set of pointers referencing the 100 code files. A child branch is created from the parent branch. An initial state of the child branch corresponds to a set of pointers referencing the same 100 code files. Subsequently, changes are made on the parent branch to File A and File B of the 100 code files. An updated state of the parent branch corresponds to a set of pointers referencing the revised File A and File B, and the 98 code files that remain unchanged. Moreover, changes are made on the child branch to File C and File D of the 100 code files. An updated state of the child branch corresponds to a set of pointers referencing the revised File C and File D, and the 98 code files that remain unchanged. Subsequently, a merger is performed on the parent branch and the child branch. The child branch is updated by incorporating the updated state of the parent branch. Incorporating the updated state of the parent branch into the child branch includes updating the pointers on the child branch to reference any modified files on the parent branch. Hence, a new state of the child branch corresponds to a set of pointers referencing the revised File A, File B, File C, and File D, and the 96 code files that were unchanged on the parent branch and the child branch.

As another example, a particular state of the parent branch corresponds to a particular version of a set of code. A child branch is created based on the particular state of the parent branch. There are no differences between the particular state of the parent branch and the initial state of the child branch. Subsequently, changes are made on the parent branch. An updated state of the parent branch indicates that a list of differences between the updated state and the particular state of the parent branch include Difference A and Difference B. Moreover, changes are made on the child branch. An updated state of the child branch indicates that a list of differences between the updated state and the initial state of the child branch includes Difference C and Difference D. Subsequently, a merger is performed on the parent branch and the child branch. The child branch is updated by incorporating the updated state of the parent branch. Incorporating the updated state of the parent branch into the child branch includes appending the differences (since the branching point) on the parent branch to the list of differences on the child branch. Hence, a new state of the child branch indicates that a list of differences includes Difference A, Difference B, Difference C, and Difference D.

One or more embodiments include determining a hierarchical order for a set of experimental branches associated with the working repository (Operation 306). The branch management system 100 obtains metadata associated with the set of branches. The branch management system 100 determines the hierarchical order based on the metadata. As an example, each branch may be associated with metadata that indicates one or more parent branches of the branch. A branch management system may generate a tree graph representing a hierarchical order of the branches. Based on the metadata of a first branch, the branch management system may determine that the first branch has no parents. A top node of the tree graph may represent the first branch. Further, the branch management system may identify branches that name the first branch as a parent. The branch management system may determine that a next level of the hierarchical order includes the branches that name the first branch as a parent. The branch management system may determine the hierarchical order for all branches in this manner.

One or more embodiments include determining whether the hierarchical order is valid (Operation 308). The branch management system 100 checks the hierarchical order determined at Operation 306 against one or more validity rules. If the hierarchical order fails a validity rule, then the hierarchical order is not valid. If the hierarchical order is not valid, then an error is generated (Operation 314).

A validity rule, for example, may indicate that there may be no loops in the hierarchical order. If Branch A is a descendant of Branch B, then Branch B must not be a descendant of Branch A. As an example, a set of branches may include a first branch, a second branch, and a third branch. Metadata of the second branch may indicate that the first branch is a parent of the second branch. Metadata of the third branch may indicate that the second branch is a parent of the third branch. Metadata of the first branch may indicate that third branch is a parent of the first branch. Here, the third branch is descendant of the first branch (the third branch is a child of the second branch; the second branch is a child of the first branch), and the first branch is a descendant of the third branch. Hence, an invalid hierarchical order exists.

One or more embodiments include setting the first level in the hierarchical order as the "current level" (Operation 310). The branch management system 100 performs the synchronization process using a top-down approach. The synchronization process begins at the first level in the hierarchical order.

In an embodiment, the branch management system 100 may traverse the branches in a different sequence. Different ways of traversing the branches are further described below.

One or more embodiments include selecting a branch in the current level as the "current branch" (Operation 312). The branch management system 100 selects any branch in the current level.

One or more embodiments include attempting to update the current branch by incorporating a current state of a parent branch of the current branch (Operation 316). The branch management system 100 selects any parent branch of the current branch for a first attempt at merging. Alternatively, the branch management system 100 may prioritize selection of certain parent branches over other parent branches. The branch management system 100 may prioritize, for example, parent branches for which at least one merger has been performed during the current synchronization cycle.

In an embodiment, the branch management system 100 may select multiple parent branches of the current branch. A three-way merge, or an n-way merge, between the parent branches and the current branch may be attempted.

One or more embodiments include determining whether there are any conflicts between the parent branch and the current branch (Operation 318). The branch management system 100 determines whether there are conflicting changes on the parent branch and the current branch. As an example, a variable var may be renamed as vari on a parent branch. The same variable var may be renamed as variab on a child branch. A branch management system detects a conflict based on the different names of the variable on the parent branch and on the child branch.

If there is a conflict, one or more embodiments include determining whether the current branch has any other parent branches for which a merge has not yet been attempted (Operation 320). The branch management system 100 checks the hierarchical order for the set of branches to determine whether the current branch has any other parent branches.

If there are no other parent branches, then the branch management system 100 resolves the conflict detected at Operation 318 (Operation 322). The branch management system 100 resolves the conflict based on conflict resolution rules and/or user input. The branch management system 100 determines a conflict type of the conflict between the parent branch and the current branch. The branch management system 100 applies a conflict resolution rule applicable to the conflict type, if any. If the conflict remains unresolved, the branch management system 100 presents a request at a user interface for user input that resolves the conflict.

If there is another parent branch, then the branch management system 100 reiterates Operation 316 with respect to the other parent branch. Hence, prior to attempting to resolve the conflict between a particular parent branch and the current branch, the branch management system 100 attempts to perform a merger between another parent branch and the current branch.

As an example, Branch A may be a parent of Branch B and Branch C. Branch B and Branch C may each be a parent of Branch D. A synchronization process may be initiated. A branch management system may attempt to merge Branch A into Branch B. A conflict may be detected. The conflict may be resolved based on user input. Then, the branch management system may attempt to merge Branch A into Branch C. The merge may be successfully performed without any conflicts. Subsequently, the branch management system may attempt to merge Branch C into Branch D. A conflict may be detected. Since Branch C now incorporates the changes from Branch A, the conflict between Branch C and Branch D may stem from the changes on Branch A. Moreover, the same changes on Branch A that caused the earlier conflict between Branch A and Branch B may be causing the conflict between Branch C and Branch D. The earlier conflict between Branch A and Branch B was already resolved based on user input. Hence, rather than requesting user input to resolve the conflict between Branch C and Branch D, the branch management system attempts to first merge Branch B and Branch D. Since Branch B already incorporates the user input that resolved the conflict stemming from Branch A, Branch B is successfully merged into Branch D without any conflict. Subsequently, the branch management system reattempts merging Branch C into Branch D. Since Branch D already incorporates the user input that resolved the conflict stemming from Branch A (by way of merging with Branch B), Branch C is now successfully merged into Branch D without any conflict.

One or more embodiments include updating the current branch by incorporating the parent branch into the current branch (Operation 324). Examples for updating a branch by incorporating a parent branch are described above with reference to Operation 304. Updating the current branch may also include incorporating any user input that were obtained to resolve conflicts during the merger.

One or more embodiments include determining whether the current branch has any other parent branches for which a merge has not yet been completed (Operation 326). The branch management system 100 completes a merge between each parent branch and the current branch. If there is another parent branch for which a merge has not yet been completed, the branch management system 100 reiterates Operation 316 with respect to the other parent branch.

One or more embodiments include determining whether there are any other branches in the current level in the hierarchical order (Operation 328). The branch management system 100 performs a width-first traversal, traversing through all branches in the current level prior to moving onto the next level. If there is another branch in the current level, then the branch management system 100 selects the other branch as the "current branch" (Operation 330). The branch management system 100 reiterates Operation 316 with respect to the current branch.

In an embodiment, the branch management system 100 may traverse the branches in a different sequence. Different ways of traversing the branches are further described below.

One or more embodiments include determining whether there are any other levels in the hierarchical order (Operation 332). The branch management system 100 ensures that all branches in all levels of the hierarchical order are traversed. If there are no other levels, then the current synchronization cycle ends. A next synchronization cycle may begin if the branch management system determines that another trigger has occurred at Operation 302.

One or more embodiments include setting the next level in the hierarchical order as the "current level" (Operation 334). As described above, the branch management system 100 performs the synchronization process using a top-down approach. The branch management system 100 proceeds to process the next level in the hierarchical order. The branch management system 100 sets the next level as the "current level" and reiterates Operation 312 with respect to the current level.

In an embodiment, the branch management system 100 may traverse the branches in a different sequence. The branch management system 100 may traverse the branches in any order, as long as a parent branch is not merged into a child branch until the parent branch is brought in sync. A parent branch is brought in sync if the parent branch has incorporated all changes on its ancestor branches. The branch management system serially updates each of the branches, such that all branches associated with a set of code, or all branches in one or more particular repositories, are traversed.

As an example, Branch A may be a parent of Branch B and Branch C. Branch B and Branch C may each be a parent of Branch D. A synchronization process may be initiated. In a width-first approach, a branch management system may first merge Branch A into Branch B. Then the branch management system may merge Branch A into Branch C. Then, the branch management system may merge Branch B into Branch D, then Branch C into Branch D. Hence, all branches on the second level (that is, Branch B and Branch C) are updated prior to updating branches on the third level (that is, Branch D). In an alternative approach, the branch management system may first merge Branch A into Branch B. Then the branch management system may merge Branch B into Branch D. This merger is allowed because Branch B has incorporated all changes on its ancestor branches (that is, Branch A). Then the branch management system may merge Branch A into Branch C. Then the branch management system may merge Branch C into Branch D.

Figure 4:
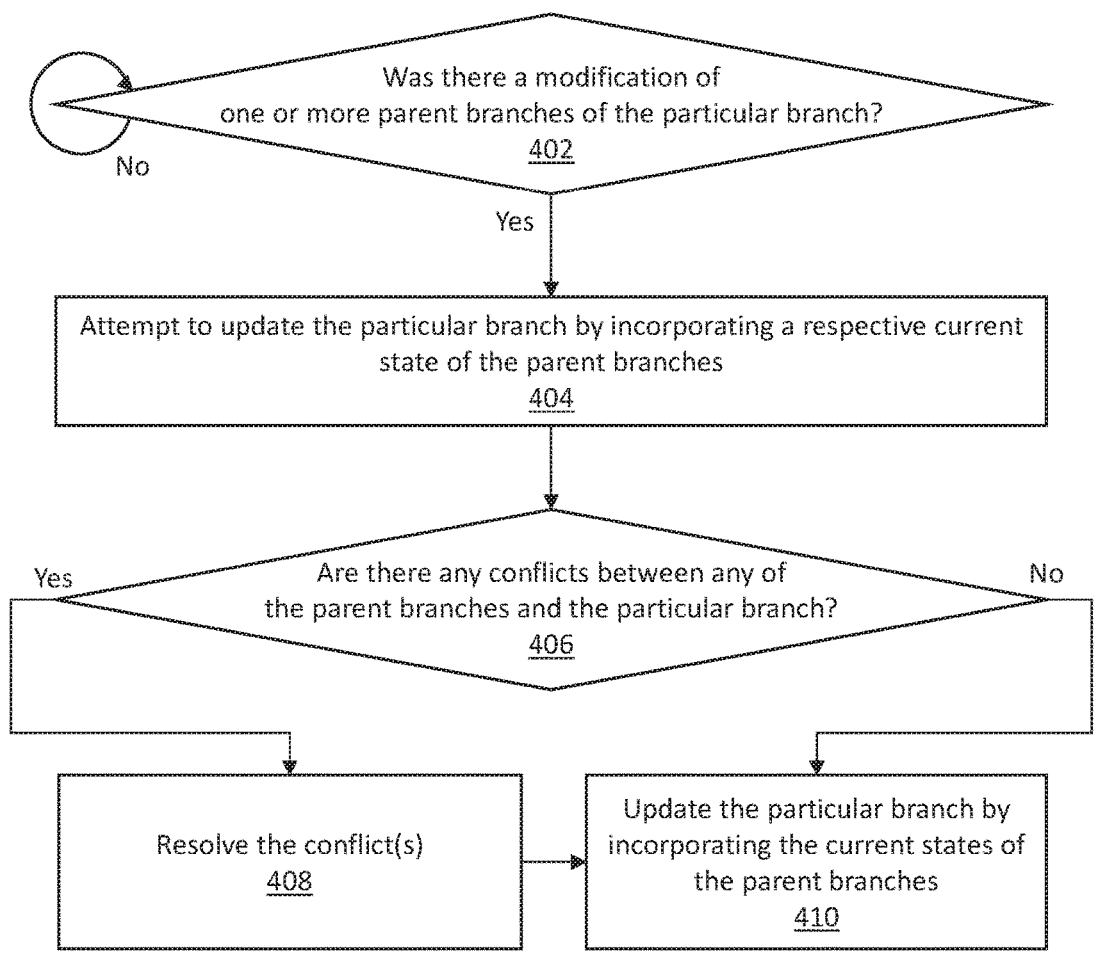
FIG. 4 illustrates another example set of operations for synchronizing a set of code branches, in accordance with one or more embodiments.

FIG. 4 illustrates another example set of operations for synchronizing a set of branches, in accordance with one or more embodiments. One or more operations illustrated in FIG. 4 may be modified, rearranged, or omitted all together. Accordingly, the particular sequence of operations illustrated in FIG. 4 should not be construed as limiting the scope of one or more embodiments.

In an embodiment, the synchronization process as illustrated in FIG. 4 is performed for a set of code maintained by a master repository and one or more working repositories. The master repository maintains a master branch. A working repository maintains a main branch and one or more experimental branches. The main branch is created by incorporating a particular state of the master branch. An experimental branch is created by incorporating a particular state of the main branch. The synchronization process may be performed for the set of branches being maintained across the master repository and the working repositories. In other embodiments, the synchronization process as illustrated in FIG. 4 is performed for a set of code that is maintained by a different arrangement of repositories. For example, all branches may be maintained in a single repository. Alternatively, multiple branches may be maintained in each repository.

The synchronization process as illustrated in FIG. 4 is implemented by a set of operations that are performed for each branch in the set of branches that to be synchronized. By performing the set of operations for each branch, changes are propagated from each parent branch through each child branch. A modification of a particular branch triggers a chain reaction that updates the descendant branches of the particular branch.

One or more embodiments include determining whether there was a modification of one or more parent branches of a particular branch (Operation 402). A branch management system 100 determines the parent branches of the particular branch based on metadata associated with the particular branch. The branch management system 100 determines whether there have been any changes to each parent branch, since a last merger between the parent branch and the particular branch. A change in a parent branch serves as a trigger to merge the parent branch into the particular branch. Hence, the merge is triggered without any manual user intervention.

One or more embodiments include attempting to update the particular branch by incorporating a respective current state of the parent branches (Operation 404). The branch management system 100 attempts to perform a sequence of mergers, each merger being applied to one of the parent branches and the particular branch. Additionally or alternatively, the branch management system 100 attempts to perform a merger for multiple parent branches, using a three-way merge, or an n-way merge, for the parent branches and the particular branch.

One or more embodiments include determining whether there are any conflicts between any of the parent branches and the particular branch (Operation 406). Examples for determining conflicts are described above with reference to Operation 318 of FIG. 3.

If there is a conflict, then the branch management system 100 resolves the conflict (Operation 408). Examples for resolving conflicts are described above with reference to Operation 322 of FIG. 3.

One or more embodiments include updating the particular branch by incorporating the current states of the parent branches (Operation 410). Examples for updating a branch by incorporating the current state of a parent branch are described above with reference to Operation 324 of FIG. 3.

In an embodiment, Operations 404-410 are not performed in sequential order. The branch management system 100 may first attempt to merge one parent branch into the particular branch, as described at Operation 404. The branch management system 100 may then determine whether there are any conflicts between the parent branch and the particular branch, as described at Operation 406. The branch management system 100 may then resolve any conflicts, as described at Operation 408. The branch management system 100 may then merge the parent branch into the particular branch, as described at Operation 410. The branch management system 100 may then attempt to merge another parent branch into the particular branch, as described at Operation 404. The branch management system may thus reiterate Operations 404-410 for each parent branch.

In an embodiment, the branch management system may attempt to merge the parent branches into the particular branch in a manner similar to Operations 316-324 of FIG. 3. The branch management system 100 may first attempt to merge one parent branch into the particular branch, as described at Operation 404. The branch management system 100 may then determine whether there are any conflicts between the parent branch and the particular branch, as described at Operation 406. If there is a conflict, prior to resolving the conflict, the branch management system 100 first determines whether there are any other parent branches. If there is another parent branch, then the branch management system attempts to merge the other parent branch into the particular branch, as described at Operation 404. The branch management system 100 may thus attempt to merge each of the parent branches into the particular branch, prior to resolving a conflict between any of the parent branches and the particular branch.

Based on the synchronization process as illustrated in FIG. 4, there is no need to determine an overall hierarchical order for the set of branches. The changes are propagated from a parent branch to all descendants through a chain effect. As an example, Branch A is a parent of Branch B; Branch B is a parent of Branch C. There is a modification on Branch A. Based on Operation 402 for Branch B, a branch management system 100 determines that there is a modification to a parent branch (that is, Branch A) of Branch B. Based on Operations 404-410 for Branch B, the branch management system 100 merges Branch A into Branch B. Then, based on Operation 402 for Branch C, the branch management system 100 determines that there is a modification to a parent branch (that is, Branch B) of Branch C (since Branch B was just modified to incorporate the current state of Branch A). Based on Operations 404-410 for Branch C, the branch management system 100 merges Branch B into Branch C. Hence, the modifications of Branch A are propagated from Branch A to Branch B, and then propagated from Branch B to Branch C.

4. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 5:
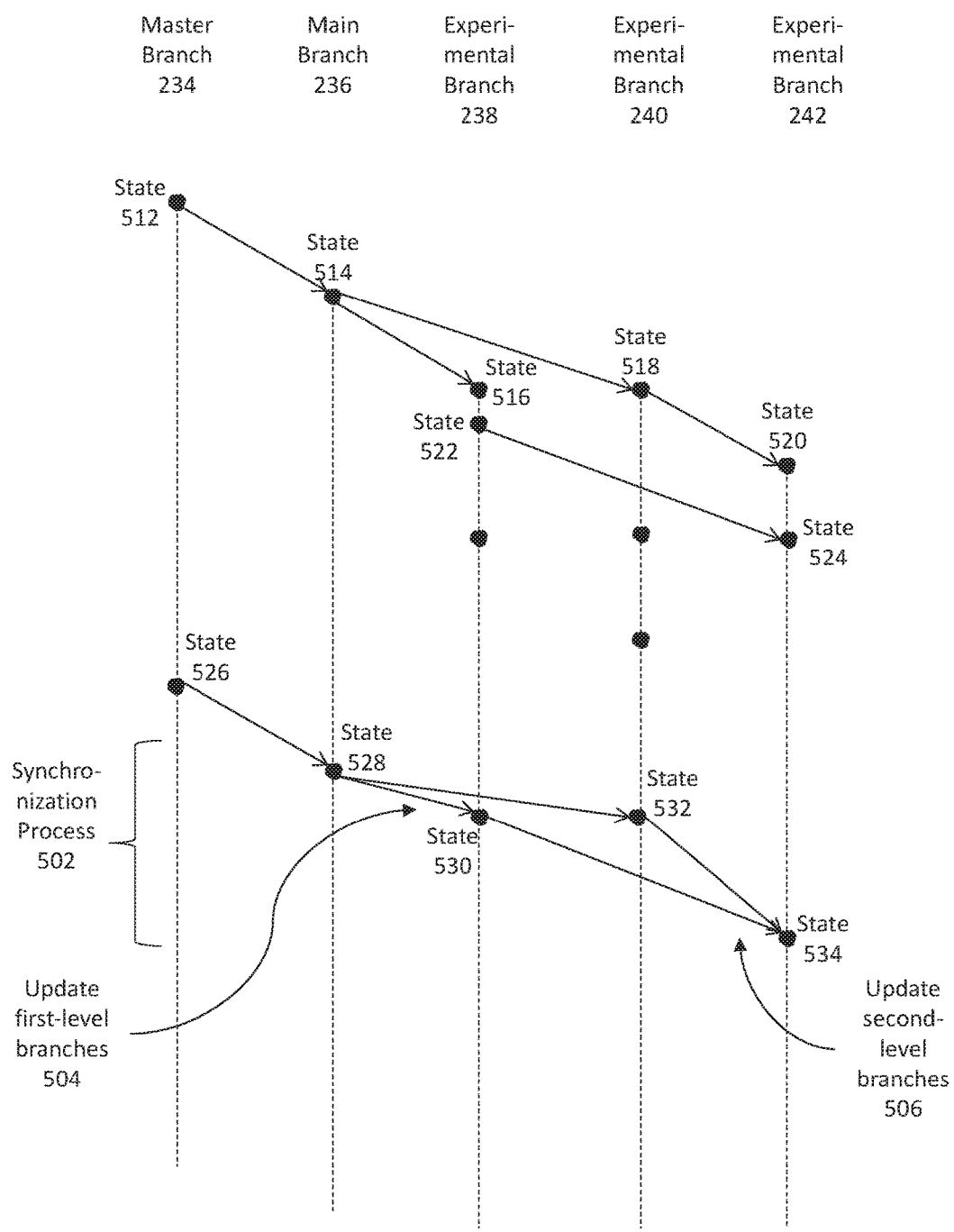
FIG. 5 illustrates an example for synchronizing a set of code branches, in accordance with one or more embodiments.

FIG. 5 illustrates an example for synchronizing a set of code branches, in accordance with one or more embodiments. FIG. 5 includes five branches: the master branch 234, the main branch 236, and the experimental branches 238-242. The master branch 234, the main branch 236, and the experimental branches 238-242 are related to each other according to the hierarchical order 200 illustrated in FIG. 2.

Initially, the master branch 234 is at an initial state 512. The main branch 236 branches off from state 512 of the master branch 234, thereby incorporating state 512 of the master branch 234. Metadata of the main branch 236 indicates that the master branch 234 is a parent of the main branch 236. The initial state 514 of the main branch 236 is associated with the same version of code as state 512 of the master branch 234. State 512 may be referred to as a "branching point."

Similarly, the experimental branch 238 branches off from state 514 of the main branch 236. Metadata of the experimental branch 238 indicates that the main branch 236 is a parent of the experimental branch 238. The experimental branch 240 branches off from state 514 of the main branch 236. Metadata of the experimental branch 240 indicates that the main branch 236 is a parent of the experimental branch 240. State 516 and state 518 are associated with the same version of code as state 514.

The experimental branch 242 branches off from state 518 of the experimental branch 240. Metadata of the experimental branch 242 indicates that the experimental branch 240 is a parent of the experimental branch 242. State 520 is associated with the same version of code as state 518. Then, development on the experimental branch 238 results in a new version of code, represented by state 522 of the experimental branch 238. Then, state 522 is merged into the experimental branch 242, thereby generating state 524 of the experimental branch 242. Metadata of the experimental branch 242 is updated to indicate that the experimental branch 238 is also a parent of the experimental branch 242. State 524 is associated with a version of code that is merged from state 520 and state 522. Hence, the experimental branch 242 is a child of both the experimental branch 238 and the experimental branch 240.

Subsequently, additional development may occur on any of the experimental branches 238-242. Then, a change may occur on the master branch 234. The change on the master branch 234 may generate state 526 of the master branch 234.

A change on the master branch 234 is detected. The change on the master branch 234 triggers an initiation of a synchronization process 502. A branch management system updates the main branch 236 is by incorporating state 526 of the master branch 234. State 528 of the main branch 236 is generated.

The branch management system determines a hierarchical order of the experimental branches 238-242 based on the metadata associated with the experimental branches 238-242. The hierarchical order is illustrated in FIG. 2. The branch management system sets a first level of the hierarchical order as the "current level." Updates 504 on the first-level branches are performed. The branch management system selects experimental branch 238, in the current level, as the "current branch." The branch management system updates the experimental branch 238 by incorporating a current state 528 of the main branch 236. State 530 of the experimental branch 238 is generated. Then, the branch management system selects experimental branch 240, in the current level, as the "current branch." The branch management system updates the experimental branch 240 by incorporating a current state 528 of the main branch 236. State 532 of the experimental branch 240 is generated.

Since there are no more branches in the first level, the branch management system sets the next level of the hierarchical order as the "current level." Updates 506 on the second-level branches are performed. The branch management system selects experimental branch 242, in the current level, as the "current branch." The branch management system updates the experimental branch 242 by incorporating a current state 520 of the experimental branch 238 and a current state 532 of the experimental branch 240. The branch management system may perform a three-way merge between state 530, state 532, and state 524 to generate state 534 of the experimental branch 242.

The branch management system determines that no other branches and/or levels are in the hierarchical order. The synchronization process 502 ends.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
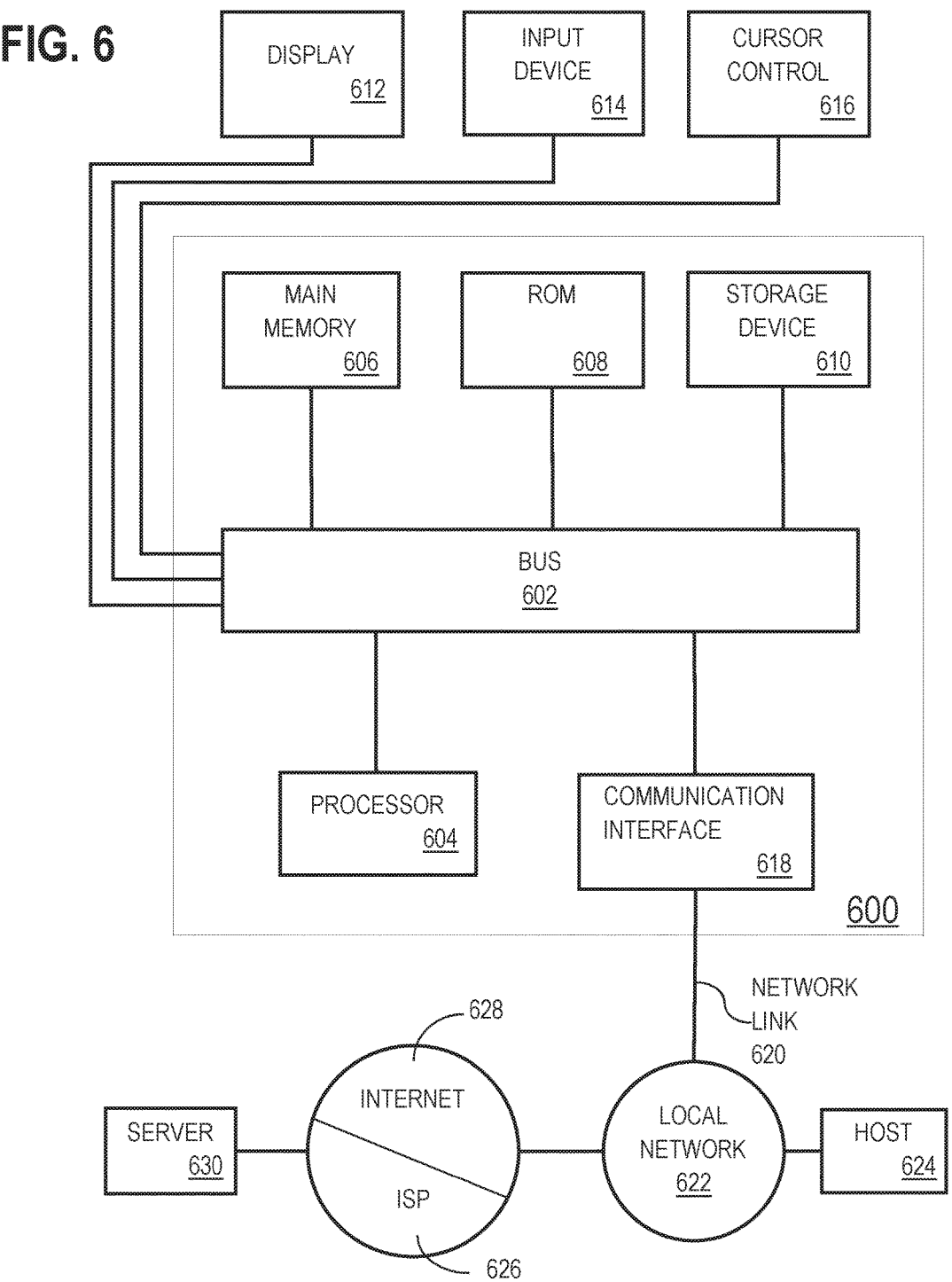
FIG. 6 shows a block diagram that illustrates a computer system in accordance with one or more embodiments.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

9. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
    maintaining a set of code branches associated with a set of code, the set of code branches comprising a first code branch, a second code branch, a third code branch, and a fourth code branch;
    updating the first code branch to generate an updated state of the first code branch;
    synchronizing the set of code branches, comprising:
        based at least on determining that the second code branch is a child of the first code branch, selecting the second code branch for updating;
        updating the second code branch, by incorporating the updated state of the first code branch, to generate an updated state of the second code branch;
        based at least on determining that the fourth code branch is another child of the first code branch, selecting the fourth code branch for updating;
        updating the fourth code branch, by incorporating the updated state of the first code branch, to generate an updated state of the fourth code branch;
        subsequent to updating the second code branch and the fourth code branch: based at least on (a) determining that the third code branch is a child of the second code branch and of the fourth code branch, and (b) determining that both the second code branch and the fourth code branch have been updated: selecting the third code branch for updating;
        updating the third code branch, by incorporating the updated state of the second code branch and by incorporating the updated state of the fourth code branch, to generate an update state of the third code branch.

2. The medium of claim 1, wherein the operations further include periodically executing the synchronizing operation.

3. The medium of claim 1, wherein the synchronizing operation is responsive to detecting that the first code branch has been updated.

4. The medium of claim 1, updating the second code branch by incorporating the updated state of the first code branch to generate an updated state of the second code branch is responsive to:
    determining that there is no conflict between the first code branch and the second code branch.

5. The medium of claim 1, wherein updating the second code branch by incorporating the updated state of the first code branch to generate an updated state of the second code branch comprises:
   determining whether there is a conflict between the first code branch and the second code branch;
   responsive to determining that there is a conflict between the first code branch and the second code branch: resolving the conflict between the first code branch and the second code branch.

6. The medium of claim 5, wherein resolving the conflict between the first code branch and the second code branch comprises:
   transmitting a message to a user indicating the conflict; and
   receiving user input that resolves the conflict.

7. The medium of claim 5, wherein resolving the conflict between the first code branch and the second code branch comprises:
   determining a conflict type of the conflict;
   identifying a conflict resolution rule for resolving the conflict based on the conflict type;
   applying the conflict resolution rule in order to resolve the conflict.

8. The medium of claim 1, wherein updating the third code branch, by incorporating the updated state of the second code branch and by incorporating the updated state of the fourth code branch comprises:
   attempting to update the third code branch by incorporating the updated state of the second code branch;
   determining that there is a conflict between the second code branch and the third code branch;
   attempting to update the third code branch by incorporating the updated state of the fourth code branch prior to attempting to resolve the conflict between the second code branch and the third code branch.

9. The medium of claim 1, wherein:
   the set of code branches further includes a fifth code branch;
   synchronizing the set of code branches, further comprising:
      subsequent to updating the second code branch: based at least on determining that the fifth code branch is another child of the second code branch, selecting the fifth code branch for updating;
      updating the fifth code branch, by incorporating the updated state of the second code branch.

10. The medium of claim 1, wherein determining that the second code branch is the child of the first code branch comprises:
    identifying metadata indicating that the second code branch is the child of the first code branch.

11. The medium of claim 1, wherein determining that the second code branch is the child of the first code branch comprises:
    referencing a hierarchical order for the set of branches that indicates that the second code branch is the child of the first code branch.

12. The medium of claim 1, wherein the first code branch is associated with a first repository, and the second code branch and the third code branch are associated with a second repository.

13. The medium of claim 1, wherein the set of branches are associated with a same repository.

14. The medium of claim 1, wherein the operations further comprise:
    subsequent to updating the third code branch:
       determining a set of differences between (a) the updated state of the third code branch and (b) the updated state of the first code branch;
       presenting the set of differences to a user for review;
       in response to receiving user input approving the set of differences: updating the first code branch by incorporating the updated state of the third code branch.

15. A non-transitory computer readable medium comprising instructions which, when executed by one or more hardware processors, causes performance of operations comprising:
    maintaining a set of code branches associated with a set of code, the set of code branches comprising a first code branch, a second code branch, and a third code branch;
    updating the first code branch to generate an updated state of the first code branch;
    updating the second code branch to generate an updated state of the second code branch;
    synchronizing the set of code branches, comprising:
       based at least on determining that the third code branch is a child of the second code branch, attempting to update the third code branch by incorporating the updated state of the second code branch;
       determining that there is a conflict between the second code branch and the third code branch;
       based at least on determining that the third code branch is a child of the first code branch, attempting to update the third code branch by incorporating the updated state of the first code branch prior to attempting to resolve the conflict between the second code branch and the third code branch;
       updating the third code branch by incorporating the updated state of the first code branch;
       subsequent to updating the third code branch by incorporating the updated state of the first code branch: updating the third code branch by incorporating the updated state of the second code branch.

16. The medium of claim 15, wherein the operations further include periodically executing the synchronizing operation.

17. The medium of claim 15, wherein the synchronizing operation is responsive to detecting that the first code branch has been updated.

18. The medium of claim 15, wherein the updated state of the first code branch incorporates user input that resolves a conflict between the first code branch and a parent branch of the first code branch.

19. The medium of claim 15, wherein subsequent to updating the third code branch by incorporating the updated state of the first code branch, any attempt to update the third code branch by incorporating the updated state of the second code branch does not involve determining that there is the conflict between the second code branch and the third code branch.

20. The medium of claim 15, wherein determining that the third code branch is the child of the first code branch comprises:
    identifying metadata indicating that the third code branch is the child of the first code branch.

21. A system, comprising:
    at least one device including a hardware processor; and
    the system being configured to perform operations comprising:
       maintaining a set of code branches associated with a set of code, the set of code branches comprising a first code branch, a second code branch, a third code branch, and a fourth code branch;

updating the first code branch to generate an updated state of the first code branch;

synchronizing the set of code branches, comprising:

based at least on determining that the second code branch is a child of the first code branch, selecting the second code branch for updating;

updating the second code branch, by incorporating the updated state of the first code branch, to generate an updated state of the second code branch;

based at least on determining that the fourth code branch is another child of the first code branch, selecting the fourth code branch for updating;

updating the fourth code branch, by incorporating the updated state of the first code branch, to generate an updated state of the fourth code branch;

subsequent to updating the second code branch and the fourth code branch: based at least on (a) determining that the third code branch is a child of the second code branch and of the fourth code branch, and (b) determining that both the second code branch and the fourth code branch have been updated: selecting the third code branch for updating;

updating the third code branch, by incorporating the updated state of the second code branch and by incorporating the updated state of the fourth code branch, to generate an update state of the third code branch.

\* \* \* \* \*